Figure 1:
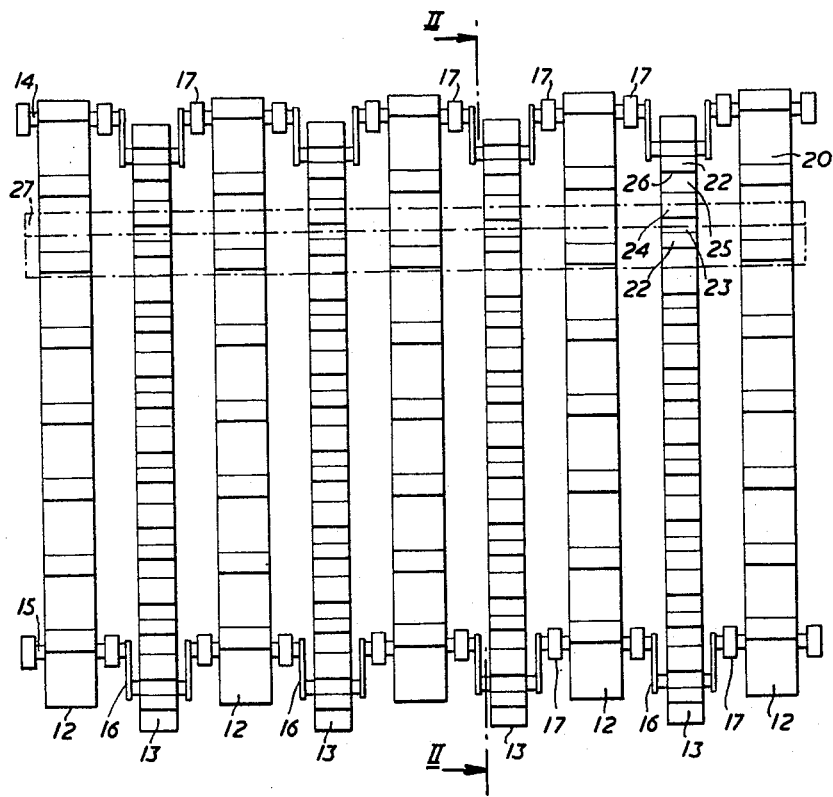

Dec. 8, 1964     O. G. HINCHLIFFE     3,160,287
APPARATUS FOR INSPECTING OBJECTS

Filed May 29, 1962     2 Sheets-Sheet 1

INVENTOR
OLIVER G. HINCHLIFFE
BY Henry C. Westin
HIS ATTORNEY

INVENTOR
OLIVER G. HINCHLIFFE
BY Henry C. Westin
HIS ATTORNEY

3,160,287
APPARATUS FOR INSPECTING OBJECTS
Oliver Gordon Hinchliffe, Sheffield, England, assignor to Davy and United Engineering Company Limited, Sheffield, England
Filed May 29, 1962, Ser. No. 198,611
Claims priority, application Great Britain May 31, 1961
3 Claims. (Cl. 214—1)

This invention relates to apparatus for automatically permitting the inspection, in succession, of different peripheral portions of elongate objects, particularly metal bars of rectangular cross section. While the apparatus may be used for other purposes, for conveninece, it will be referred to hereinafter as "inspection apparatus."

Bar-transporting racks have previously been suggested for moving bars in a direction parallel to their lengths. The previously suggested apparatus consists of a first set of fixed, parallel, racks, and a second set of racks which are movable together in vertical circular paths with respect to the fixed racks. The bars are normally supported across the fixed racks and lie between successive teeth of those racks. On movement of the movable racks, the bars are lifted from the fixed racks and are carried by the moving racks over the apices of the teeth of the fixed racks and deposited again on the fixed racks, but one tooth further on in the direction of travel along the fixed racks.

According to the present invention, inspection apparatus comprises an array of similar racks arranged side-by-side, each rack having similar upwardly-projecting teeth permitting an elongate object to be supported transversely to the length of the racks in the interdental spaces, and a plurality of co-operating pusher members, the racks and pusher members being relatively movable lengthwise of the racks, and the arrangement being such that, on the occurrence of relative movement between the pusher members and the racks, the elongate object is carried up the edges of the adjacent teeth of racks by the pusher members, is caused to fall over the apices of the teeth, and is thereby turned about its axis before being received in the next interdental space on the racks. In this way, an elongate object is moved progressively along the array of racks and, on each movement, is turned so as to present a different part of its periphery to an observer. That observer, if located at one end of the racks, for example, thereby sees in time all the periphery of the elongate object and can reject the object if, on visual inspection, it appears that that object is defective.

The pusher members are preferably constituted by a second array of racks interposed between the racks of the first array and arranged to follow vertical circular paths relative to the first array. Each tooth of the racks of the second array may have a carrying surface adapted to carry elongate objects up the sides of the teeth of the first array, and pockets which receive the objects after they have fallen over the apices of the teeth of the first array and rotated about their axes.

The invention will be more readily understood by way of example from the following description of inspection apparatus in accordance therewith, reference being made to the accompanying drawings, in which—

Figure 2:
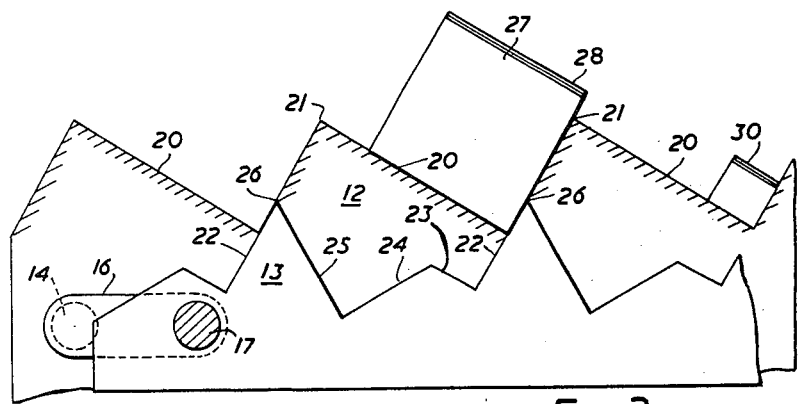
Figure 3:
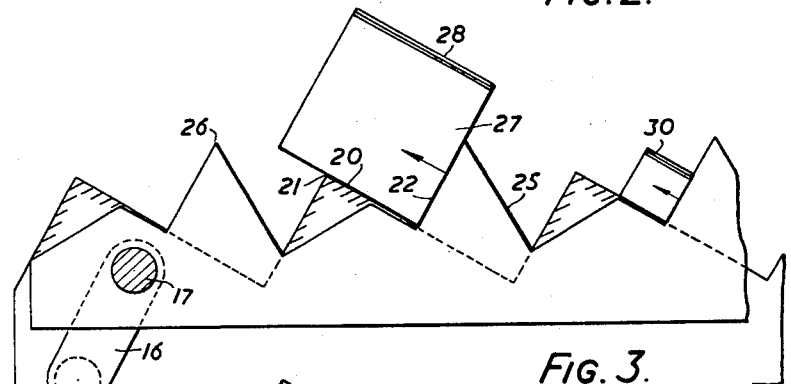
Figure 4:
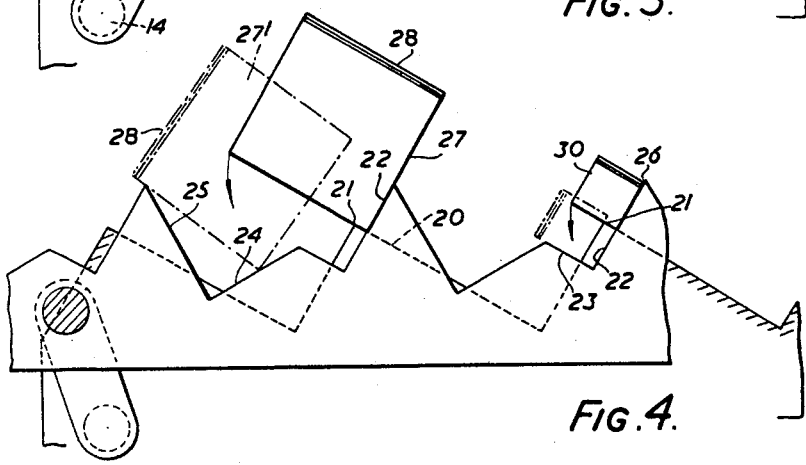

FIGURE 1 is a plan view of the apparatus,
FIGURE 2 is a section on the line II—II of FIGURE 1, and
FIGURES 3 and 4 are views, similar to FIGURE 2, but showing the apparatus in successive positions.

As shown in FIGURE 1, there is an array of fixed, parallel racks 12 lying in the same horizontal plane and equally spaced from one another. Interposed between successive pairs of racks 12 of the first array are the moving racks 13 of a second array. The racks 13 are parallel to each other and to the racks 12 and are movable together, relative to the racks 12.

The moving racks 13 are carried and driven by two similar crank shafts 14, 15, which are disposed beneath the fixed racks 12 and have cranked portions 16 on which the racks 13 are rotatably mounted. The shafts 14, 15 are mounted in bearings 17 and are driven by a motor (not shown). The moving racks 13 are thus caused to execute circular motions in vertical planes, while always remaining parallel to their initial positions.

In FIGURES 2 to 4, the teeth surfaces of the fixed racks 12 are shown shaded, in order to distinguish them from the surfaces of the moving racks 13. From these figures, it will be seen that the teeth of the fixed racks are in the form of regular series of right-triangular prisms with their bases substantially horizontal. The slide surfaces 20 of these teeth are preferably at an angle of less than 45° to the horizontal, and in the figures are shown to make an angle of 30° with the horizontal; the slide surfaces are those surfaces over which the bars are carried from the interdental spaces to and over the apices 21 of the teeth.

Each rack 13 has a series of teeth, each tooth having, in succession, a carrying surface 22 at right angles to the slide surface 20 of rack 12, a second surface 23 at right angles to the carrying surface 22 and forming with surface 22 a first bar-receiving space, a third surface 24 making an angle of about 45° to the horizontal, and a fourth surface 25, at right angles to surface 24 and leading to the apex 26 formed with the next carrying surface 22.

The cranked portion 16 and the racks 13 are so arranged that, on rotation of the shafts 14, 15, the apices 26 of the moving racks 13 at their uppermost positions are above the apices 21 of the fixed racks 12, as seen in FIGURE 4 and, in their lowermost positions, are beneath the interdental spaces formed between successive teeth of the fixed racks 12.

The operation of the bar-inspection apparatus is most readily understood by a description of the movement of a bar 27, which is shown in FIGURE 2 as resting in the interdental spaces of the fixed racks 12 immediately prior to the cycle of operation. For convenience, one side 28 of the bar 27 is identified by having a triple-line periphery.

As the shafts 14, 15 rotate anti-clockwise, as viewed in FIGURES 2 to 4, the moving racks 13 move progressively upwardly and to the left; the carrying surfaces 22 of the racks 13 engage a surface of the bar 27 and slide the bar up the slide surfaces 20 of the fixed racks 12. The position of the bar 27 halfway up the slide surface 20 is shown in FIGURE 3, where it will be seen that the teeth of the rack 13 are aligned with the interdental spaces of the fixed racks 12.

FIGURE 4 shows the position when the carrying surfaces 22 approach the apices 21 of the fixed racks 12. Because the slide surfaces 20 make an angle of less than 45° to the horizontal, the centre of gravity of the bar 27 moves beyond the apices 21 before the carrying surfaces 22 reach the top of the slide surfaces 20. As a result, the bar 27 rolls over the apices 21 and falls, having executed a rotation of about 90° about its axis, into the pocket formed between the surfaces 24, 25 of the moving racks 13, to take up the disposition indicated in FIGURE 4 at 27'.

From the position shown in FIGURE 4, the moving racks 13 continue to move towards the left and downwardly. As this movement takes place, the bar 27 is lowered until it is received in the next interdental space of the racks 12. As the shafts 14, 15 continue to rotate, the moving racks 13 move into ambush below the fixed racks 12 and return to the right toward the starting position of the next cycle, as shown in FIGURE 2.

The pockets formed by the surfaces 22, 23 of the racks 13 are designed to receive bars of smaller cross-section, as exemplified by the bar 30 of FIGURES 2 to 4. During the cycle of operation, bar 30 moves similarly to bar 27, being rolled over the apices 21 of the fixed racks to be received in the pockets between the surfaces 22, 23. As the racks 13 continue to move from the position of FIGURE 4 both downwardly and to the left, the bar 30 is deposited in the interdental spaces of the fixed racks 12.

It will be appreciated that, on each cycle of operation, the bars 27, 30 are rotated through 90° each time they are advanced from right to left by a distance of one tooth of the fixed racks 12. Thus, an observer stationed at the left-hand end of the apparatus, i.e. at the top of FIGURE 1, has each of the four faces of each of the bars 27, 30 presented to him in turn as each bar is transported by a distance of four teeth upon the racks 12. This observer may suitably mark faults which he may observe upon the bars for subsequent treatment. It will also be appreciated that it is not essential that the rack 13 be given a circular motion as described, a reciprocating motion between the positions shown in FIGURES 2 and 4 would be equally effective.

Although the apparatus has been described in relation to the inspection of bars, it will be appreciated that it may be used for other purposes, such as a cooling bed for hot bars.

It is to be understood that the apparatus described is not limited to use with bars of square section and, if necessary by modification of the pocket portions of the teeth of the moving rack 13, the apparatus may be used for bars of other cross section, such as channels, angles and I-section beams. In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Bar-inspection apparatus comprising a first array of similar racks arranged side-by-side in the same plane and having similar upwardly projecting saw-teeth permitting rods to be supported transversely of the lengths of the racks in successive interdental spaces, each tooth of the racks having a slide surface, and a second array of toothed racks arranged side-by-side and movable together relative to the racks of the first array in a path substantially parallel with the slide surfaces, each tooth of the second array having a carrying surface transverse to the slide surface of a corresponding tooth of the first array, and, in advance of the carrying surface in the direction of movement, surfaces forming pockets for the reception of rods of different cross section; whereby, on the occurrence of relative movement, a rod supported in one interdental space is carried by the carrying surfaces of the second array up the slide surfaces of the first array, until the rod rolls over the apices of the teeth of the first array, and is then received in the pockets of the second array before being deposited in the next interdental spaces of the first array.

2. Bar-inspection apparatus comprising a first array of similar racks arranged side-by-side in the same plane and having similar upwardly projecting saw-teeth permitting rods to be supported transversely of the lengths of the racks in successive interdental spaces, each tooth of the racks having a slide surface which is inclined at an angle less than 45° to the horizontal, and a second array of toothed racks arranged side-by-side and movable together relative to the racks of the first array in vertical circular paths which bring the highest points of the teeth of the second array successively up to the apices of the teeth of the first array and below the interdental spaces of the first array, each tooth of the second array having a carrying surface transverse to the slide surface of a corresponding tooth of the first array, and, in advance of the carrying surface in the direction of movement, surfaces forming a first pocket for the reception of a rod in one range of cross sections and a second pocket for the reception of a rod in another range of cross sections; whereby, on the occurrence of relative movement, a rod supported in one interdental space is carried by the carrying surfaces of the second array up the slide surfaces of the first array, until the rod rolls over the apices of the teeth of the first array, and is then received in one of the pockets of the second array according to the cross section before being deposited in the next interdental spaces of the first array.

3. Bar-inspection apparatus according to claim 2 in which, in each rack of the second array, said first pocket is formed by said carrying surface and a supporting surface at right angles thereto, and said second pocket is formed by a pair of surfaces which are mutually at right angles and which are disposed in advance of said carrying and supporting surfaces.

References Cited in the file of this patent

UNITED STATES PATENTS

| | | |
|---|---|---|
| 863,841 | George | Aug. 20, 1907 |
| 2,983,498 | MacGregor | May 9, 1961 |
| 3,042,226 | Maciejczak | July 3, 1962 |

FOREIGN PATENTS

| | | |
|---|---|---|
| 402,873 | Italy | Mar. 27, 1943 |